United States Patent
Gardner, Jr.

(10) Patent No.: US 6,194,697 B1
(45) Date of Patent: Feb. 27, 2001

(54) CALIBRATION SYSTEM FOR AN IMAGING APPARATUS AND METHOD

(75) Inventor: Richard Lynn Gardner, Jr., Greeley, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/290,807

(22) Filed: Apr. 13, 1999

(51) Int. Cl.[7] .............................. G11B 7/085; G01B 7/14
(52) U.S. Cl. ................................... 250/208.1; 369/178
(58) Field of Search ..................... 250/208.1; 324/207.11, 324/207.22; 369/30, 112, 178

(56) References Cited

U.S. PATENT DOCUMENTS

| | | | |
|---|---|---|---|
| 5,236,258 | * 8/1993 | Bunch | 312/9.31 |
| 5,479,581 | * 12/1995 | Kleinschnitz | 395/82 |
| 5,644,559 | 7/1997 | Christie, Jr. et al. | 369/36 |
| 5,682,096 | 10/1997 | Christie, Jr. et al. | 324/207.2 |
| 5,793,731 | * 8/1998 | Lee et al. | 369/178 |

* cited by examiner

Primary Examiner—Stephone B. Allen

(57) ABSTRACT

A calibration system for an imaging apparatus is disclosed. The calibration system determines the image distance between a lens and a photosensor located in the imaging apparatus. Calibration involves generating an image of a calibration target where the calibration target has a predetermined length and is located a predetermined distance from the photosensor in the imaging apparatus. The imaging apparatus may then measure the length of the image of the calibration target on the photosensor. Based on the length of the image of the calibration target on the photosensor, the calibration system may calculate the image distance.

30 Claims, 6 Drawing Sheets

CALIBRATION SYSTEM FOR AN IMAGING APPARATUS AND METHOD

FIELD OF THE INVENTION

The present invention relates generally to a calibration system and method and, more particularly, to a calibration system and method for calibrating an imaging apparatus.

BACKGROUND OF THE INVENTION

An imaging apparatus is a device that converts a narrow "scan line" portion of an image of an object to machine-readable data. The machine-readable data generated by the imaging apparatus is referred to herein as, "image data." The process of converting a scan line portion of an image of an object to image data is known in the art as, "imaging" or, "scanning" the object. The imaging apparatus may be electrically connected to a processor that analyzes the image data. Based on the image data, the processor may be able to identify the object being imaged. An example of an imaging apparatus is a bar code reader. Bar code readers are well known in the art and image bar codes to identify the objects to which the bar codes are affixed. An imaging apparatus in the form of a bar code reader may, for example, be used in an automated media exchanger to identify the media located in the automated media exchanger.

The scan line portion of the object that is imaged by the imaging apparatus is created by reflecting light from the object. Reflective areas of the object will reflect more light than nonreflective areas of the object. Areas of the object that are reflective will, thus, correspond to areas in the scan line that have high intensities of light. Likewise, areas of the object that are relatively nonreflective will correspond to areas in the scan line that have low intensities of light. The scan line portion of the object may, thus, represent the intensities of light reflected from the object.

An imaging apparatus typically comprises a lens and a photosensor. Both the lens and the photosensor may be located in a housing. The housing may have an opening to allow light to pass from the object being imaged, into the housing, and to the photosensor. The lens is located in a light path between the opening and the photosensor and serves to focus an image of the object being imaged onto the photosensor. The photosensor images the object by converting a scan line portion of the image of the object to image data.

The photosensor typically has a linear array of photodetector elements (hereinafter referred to simply as photodetectors). The photodetectors may be spaced a predetermined distance from the centerline of one photodetector to the centerline of an adjacent photodetector. The individual photodetectors output voltages corresponding to the intensity of light they receive, e.g., a high intensity of light may correspond to a high voltage and a low intensity of light may correspond to a low voltage. As previously set forth, the scan line portion of the object being imaged by the photosensor may have areas of high and low light intensity. Therefore, the areas of high light intensity in the scan line may correspond to groups of photodetectors that output relatively high voltages. Likewise, the areas of low light intensity in the scan line may correspond to groups of photodetectors that output relatively low voltages. The image data output by the photosensor is the cumulation of voltage outputs from the photodetectors.

The photosensor may be electrically connected to a processor. The processor may analyze the image data from the photosensor and may store the image data in a data storage device. In analyzing the image data, the processor may determine the relative intensities of the light received by the photodetectors based on the voltage outputs of the photodetectors. The processor may also determine the lengths of the areas of high and low light intensity of the image of the scan line portion of the object received by the photosensor. Determining the lengths of high and low light intensities in the image may be accomplished by counting the number of successive photodetectors that output high or low voltages and multiplying this number by the centerline spacing between the photodetectors. However, the processor is unable to determine the actual lengths of the scan line portions of the object that generated these areas of high and low light intensity unless the magnification of the imaging apparatus is known.

The lens typically reduces the size of the image of the object focused onto the photosensor from the actual size of the object. This reduction in the size of the image of the object relative to the actual size of the object is referred to herein as the magnification of the imaging apparatus and is designated by the letter (M). As an example of the image reduction, an imaging apparatus may have a photosensor that is approximately three centimeters in length. The image of a scan line portion of an object focused onto the photosensor may, thus, be approximately three centimeters long. However, the scan line portion of the object from which the image was created may have a length of approximately 24 centimeters. Therefore, the imaging apparatus may have a magnification of approximately 1:8 or 0.125.

The magnification of the imaging apparatus is primarily dependent on three variables: the object distance, the image distance, and the focal length of the lens. The object distance is the distance between the object being imaged and the lens. The image distance is the distance between the lens and the photosensor. The focal length of the lens depends on the shape of the lens in addition to other optical characteristics of the lens. For example, the lens may comprise a series of individual lenses, thus, the focal length of the lens will depend on the interaction between the focal lengths of the individual lenses. The object distance varies depending on the location of the lens relative to the location of the object being imaged and the image distance varies depending on the location of the lens relative to the photosensor. The image distance is generally much smaller than the object distance, therefore, a small deviation in the location of the lens will have a much greater impact on the image distance than on the object distance. The image distance is, thus, typically the most significant variable affecting the magnification of the imaging apparatus. Small deviations in the object distance typically have negligible effects on the magnification of the imaging apparatus.

As stated above, the magnification of the imaging apparatus must be known in order for the processor to have the ability to determine the lengths of scan line portions of objects being imaged. The magnification of the imaging apparatus may be difficult to accurately determine given the sensitivity of the magnification to small deviations in the image distance. However, if the lens were able to be precisely located relative to the photosensor, the magnification of the imaging apparatus could be accurately determined.

During the manufacture of an imaging apparatus, the lens may be secured to the housing so as to be located a precise image distance from the photosensor. This precise placement of the lens relative to the photosensor may require that a mounting structure be provided for the lens that permits the lens to be secured to the housing at a predetermined and precise image distance from the photosensor. However, the mounting structure may add expense and complexity to the imaging apparatus. In addition, the process of precisely locating the lens a predetermined image distance from the photosensor may add additional expense and manufacturing time to the imaging apparatus. Furthermore, the process of precisely locating the lens may be subject to errors, which may lead to the imprecise placement of the lens relative to the photosensor. One example of this problem occurs if an assembler secures the lens at an incorrect image distance. This will cause errors when the imaging apparatus attempts to determine the scan line length of an object.

As an alternative to precisely locating the lens relative to the photosensor, the lens may be secured in the imaging apparatus at an unknown image distance from the photosensor. The image distance between the lens and the photosensor may then be physically measured. The measured image distance may then be input to the processor and permanently stored by the processor. The processor may use the measured image distance to calculate the lengths of scan line portions of objects being imaged. However, the process of measuring the image distance may add additional expense and manufacturing time to the imaging apparatus. Errors may also occur in measuring the image distance and inputting the image distance into the processor. Additionally, in the event the imaging apparatus is ever replaced, the image distance of the new imaging apparatus must be input to the processor. Errors in determining scan line lengths of objects may occur if a user neglects to input the new image distance into the processor or if the user inputs an incorrect image distance into the processor. The same errors may occur if the processor is replaced, a user may not correctly input the image distance of the existing imaging apparatus into the new processor.

Therefore, a need exists for an imaging apparatus that may be easily manufactured and calibrated to determine the image distance, and hence, the magnification of the imaging apparatus.

SUMMARY OF THE INVENTION

A calibration system for an imaging apparatus is disclosed. The calibration system determines the image distance between a lens and a photosensor located in the imaging apparatus. When the image distance has been determined, the magnification of the imaging apparatus may be calculated. The imaging apparatus may then calculate the actual lengths of objects being imaged based upon the magnification.

Calibrating an imaging apparatus commences by the imaging apparatus imaging a calibration target. The calibration target has a predetermined length and is located a predetermined distance from the photosensor in the imaging apparatus. When the imaging apparatus has imaged the calibration target, the magnification of the imaging apparatus may be calculated. Specifically, the magnification of the imaging apparatus is calculated as the ratio of the length of the image of the calibration target to the actual length of the target. After the magnification of the imaging apparatus has been calculated, the image distance may then be calculated using general optical equations. The magnification of the imaging apparatus may then be calculated for objects located at different distances from the imaging apparatus. This allows the imaging apparatus to measure the actual lengths of objects located at varying distances from the imaging apparatus.

DETAILED DESCRIPTION OF THE INVENTION

Figure 1:
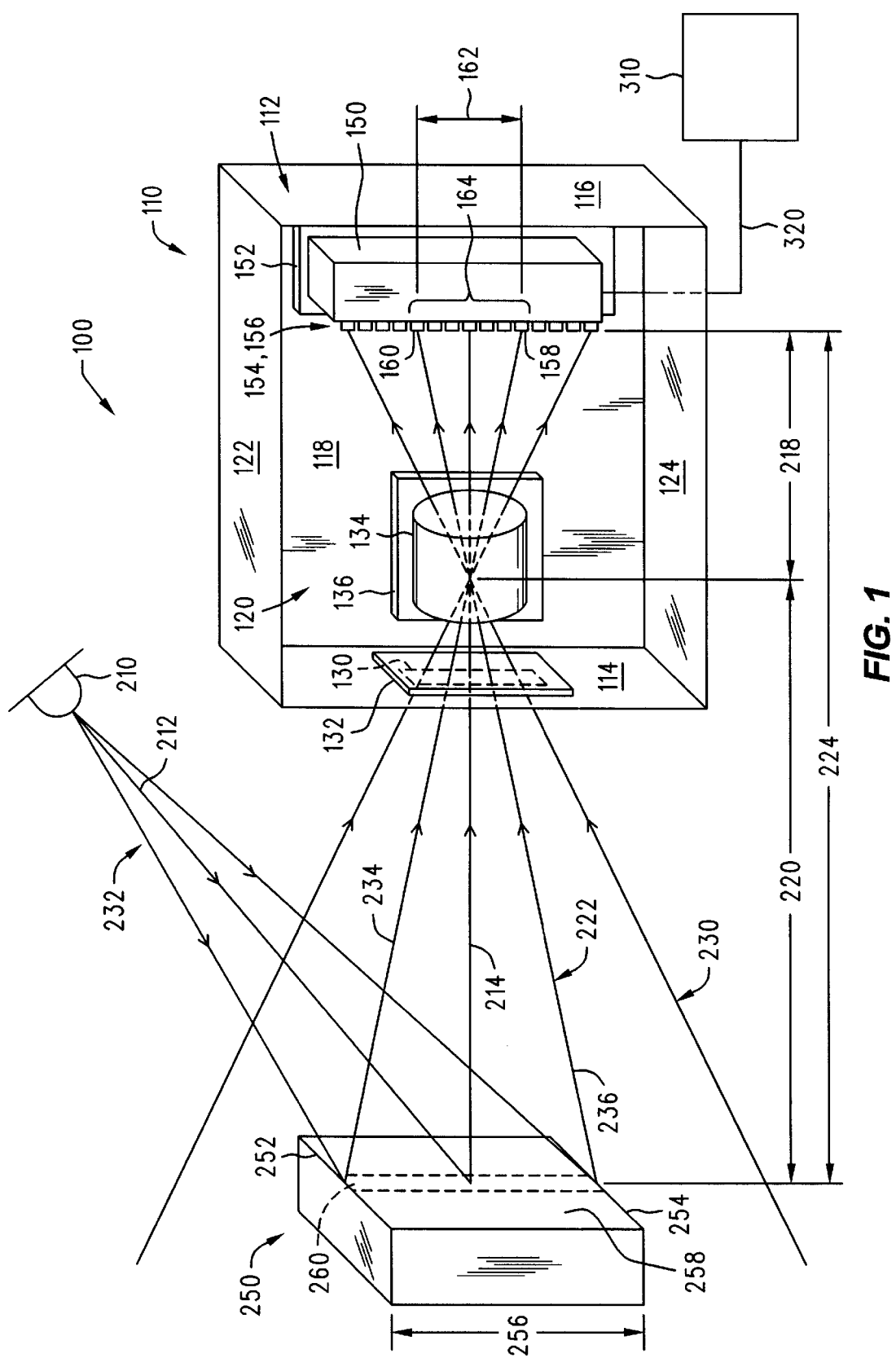
FIG. 1 is a side perspective view of a calibration system used to calibrate an imaging apparatus.

FIGS. 1 through 8, in general, illustrate a method of calibrating an imaging apparatus 110, wherein the imaging apparatus 100 is of the type comprising a lens 134 and a photosensor 150, the lens 134 and the photosensor 150 being separated by an image distance 218. The method comprising: providing a target 250, the target 250 having a predetermined target length 256 and being located a predetermined object distance 220 from the lens 134; generating an image of the target 250 with the imaging apparatus 110; determining the image length 162 of the image of the target 250; determining the image distance 218 based upon the image length 162, the target length 218, and the object distance 220.

FIGS. 1–8 further illustrate a method of calibrating an imaging apparatus 110 within an automated media exchanger 410, wherein the imaging apparatus 110 is of the type comprising a lens 134 and a photosensor 150, the lens 134 and the photosensor 150 being separated by an image distance 464. The method comprising: providing a target 416, the target 416 having a predetermined target length 422 and being located a predetermined object distance 462 from the lens 134; generating an image of the target 416 with the imaging apparatus 110; determining the image length of the image of the target 416; determining the image distance 464 based upon the image length, the target length 422, and the object distance 462.

FIGS. 1–8 also illustrate a calibration system 100 for an imaging apparatus 110, the imaging apparatus 110 being of the type comprising a lens 134 and a photosensor 150, the lens 134 and the photosensor 150 being separated by an image distance 218. The calibration system 100 comprising: a target 250 associated with the imaging apparatus 110; a light source 210 associated with the target 250; wherein the target 250 has a predetermined target length 256 and is located a predetermined object distance 220 from the lens 134; and wherein the target 250 is imageable by the imaging apparatus 110.

FIGS. 1–8 further illustrate an automated media exchanger 410 incorporating a calibration system for an imaging apparatus 110. The imaging apparatus 110 being of the type comprising a lens 134 and a photosensor 150 separated by an image distance 464. The automated media exchanger 410 comprising: a target 416 associated with the automated media exchanger 410; a light source 370 associated with the target 416; wherein the target 416 has a predetermined target length 422 and is located a predetermined object distance 464 from the lens 134; and wherein the target 415 is imageable by the imaging apparatus 110.

Having thus described the calibration system and a method of calibrating an imaging apparatus in general, the system and method will now be described in further detail.

FIG. 1 illustrates an embodiment of the calibration system 100 used to calibrate an imaging apparatus 110. The imaging apparatus 110 may, as an example, be a bar code reader as is known in the art. The calibration system 100 may comprise a light source 210, a calibration target 250, a processor 310, and the imaging apparatus 110. The calibration system 100 may further comprise an incident light path 212 extending between the light source 210 and the calibration target 250. The calibration system 110 may also comprise an image light path 214 extending between the calibration target 250 and the imaging apparatus 110. These light paths and light beams associated with the light paths will be described in further detail below.

The imaging apparatus 110 may be located in a housing 112. The housing 112 may be a parallelepiped structure having a front side 114, a back side 116, a right side 118, a left side 120, a top side 122, and a bottom side 124. The left side 120 of the housing 112 is illustrated as being open, in FIG. 1, in order to better view the components of the imaging apparatus 110 located in the housing 112. The front side 114 may have an opening 130. The opening 130 may serve to allow light to enter the housing 112.

A window 132, a lens 134, and a photosensor 150 may be located in the housing 112. The window 132 may be located in the opening 130 in the front side 114 of the housing 112. The window 132 may serve to keep contaminates from entering the housing 112, while allowing light to enter the housing 112. The window 132 may, for example, be a pane of transparent material. Additionally, the window 132 may be an optical filter that passes a predetermined band of light frequencies.

The photosensor 150 may be located in the vicinity of the back side 116 of the housing 112. The photosensor 150 may be secured to the right side 118 of the housing 112 by the use of a photosensor mount 152. The photosensor mount 152 may be a device as is known in the art that secures the photosensor 150 to a fixed location. The photosensor 150 serves to convert light to machine-readable image data, referred to herein simply as, "image data." The processor 310 may be electrically connected to the photosensor 150 by an image data line 320.

The photosensor 150 is a device that converts light to image data. The photosensor 150 is described herein as being a charged coupled device. However, it is to be understood that other photosensor devices that convert light to image data may be substituted for the charged coupled device described herein. The photosensor 150 may have a photodetector array 154 comprising a plurality of individual photodetectors 156. The photodetector array 154 may have a length of approximately three centimeters. There may be approximately 2,700 photodetectors 156 in the photodetector array 154 and the photodetectors 156 may each have a width of approximately 11 microns. The photodetectors 156 may be spaced a predetermined distance from the centerline of one photodetector to the centerline of an adjacent photodetector. The photodetectors 156 may face toward the opening 130 in the front side 114 of the housing 112. It is noted that, for illustration purposes, the photodetectors 156 are depicted in a greatly enlarged fashion in FIGS. 1 and 2.

The photodetectors 156 may output image data in the form of voltages corresponding to the intensity of light received by the individual photodetectors 156. A photodetector 156 that receives a high intensity of light may output a high voltage and a photodetector 156 that receives a low intensity of light may output a low voltage. The photodetectors 156 may best respond to a particular frequency band of light. Therefore, the light source 210 may be chosen to emit light in this frequency band. Likewise, if the window 132 is an optical filter, the filter may be chosen to pass light frequencies that are within the frequency band that the photodetectors 156 are best able to convert to image data.

The lens 134 may be a lens as is known in the art and of the type that focuses light onto the photodetector array 154. The lens 134 may, as an example, be of the type commonly known in the art as a Cooke Triplet. The lens 134 may have a focal length (f), which is dependent on the shape and other optical characteristics of the lens 134. The focal length may, as an example, be approximately 17.2 millimeters. The optical specifications of the lens 134, including the modular transfer function, depend on the specific application of the imaging apparatus. These optical specifications are not critical to the calibration system 100 so long as the lens 134 is able to focus an image of a calibration target 250 onto the photosensor 150.

The lens 134 may be located in the housing 112 between the window 132 and the photosensor 150. The lens 134 may be secured to the right side 118 of the housing 112 by the use of a lens mount 136. The lens mount 136 may serve to allow the lens 134 to be quickly and easily secured to the right side 118 of the housing 112. The lens 134 may be located an image distance 218 from the photosensor 150. The image distance 218 may, for example, be between about 41.5 and about 42.5 millimeters.

As previously described, it is difficult to precisely set or measure the image distance 218 when the imaging apparatus 110 is manufactured. Accordingly, the image distance 218 may not be precisely known at the time that the imaging apparatus 110 is manufactured. The calibration system 100, however, is able to precisely determine the image distance 218 for any imaging apparatus 110 as will now be described in detail.

Referring again to FIG. 1, the calibration target 250 may be fixed at a predetermined location relative to the imaging apparatus 110. The calibration target 250 may have a surface 258 that is uniformly reflective throughout the surface 258. An example of such a reflective surface is a light-colored or a white surface. The reflectivity of the surface 258 may be made to be substantially uniform by having the surface 258 flat and having the color of the surface 258 uniform throughout the surface 258. The surface 258 may have a first edge 252 and a second edge 254. The first edge 252 and the second edge 254 may be parallel to each other and they may be separated by a target length 256. The surface 258 of the calibration target 250 may be located an approximated object distance 220 from the lens 134 and a predetermined total track length 224 from the photosensor 150. Because the location of lens 134 may not be precisely known prior to calibration, the object distance 220 may not be precisely known. However, the object distance 220 is typically very large relative to any deviation in the location of the lens 134, therefore, a small deviation in the location of the lens 134 will have a minimal effect the object distance 220. The object distance 220 may, thus, be approximated without substantially impacting the calculations used to determine the image distance 218.

In addition to the aforementioned light paths, the calibration system 100 may comprise a plurality of light beams. The light source 210 may emit an incident light beam 232 that follows the incident light path 212 from the light source 210 to the calibration target 250. The frequency of light emitted by the light source 210 may be in the aforementioned frequency band that the photodetectors 156 are best able to convert to image data. The previously mentioned image light path 214 may extend from a point external to the imaging apparatus 110, through the opening 130 in the housing 112, through the window 132, through the lens 134, and may terminate at the photodetectors 156. An image light beam 230 may follow the image light path 214 to the array 154 of photodetectors 156. The image light beam 230 may intersect the surface 258 of the calibration target 250 at a scan line portion 260.

The calibration system may also include a reflection light beam 222. The reflection light beam 222 may be a light beam that reflects from the calibration target 250 as a result of the calibration target 250 being illuminated by the incident light beam 232. The reflection light beam 222 may be a section of the image light beam 230 that includes an image of the calibration target 250. The reflection light beam 222 aids in the description of the calibration system 100 by distinguishing the section of the image light beam 230 that is an image of the calibration target 250 from other sections of the image light beam 230. The reflection light beam 222 may follow the image light path 214 into the imaging apparatus 110 and may terminate at the photosensor 150 on a group of image photodetectors 164. The image photodetectors 164 may extend from a first image photodetector 158 to a last image photodetector 160. The reflection light beam 222 may comprise a first light beam 234 and a second light beam 236. The first light beam 234 may extend from the first edge 252 of the calibration target 250 to the first image photodetector 158. The second light beam 236 may extend from the second edge 254 of the calibration target 250 to the last image photodetector 160. The first image photodetector 158 and the last image photodetector 160 may be separated by an image length 162.

Having described the components of the calibration system 100, the operation of the calibration system 100 will now be described. The following description of the operation of the calibration system 100 is set forth in the flow chart of FIG. 3. As previously set forth, the calibration system 100, FIG. 1, is able to determine the image distance 218 in the imaging apparatus 110. Once the image distance 218 is known, the magnification of the imaging apparatus 110 may be calculated for any given total track length 224. The imaging apparatus 110 may, thus, be able to determine the scan line lengths of objects imaged by the imaging apparatus 110. The aforementioned calibration procedure is described in detail below.

Calibration commences by illuminating the calibration target 250. During illumination, the light source 210 emits the incident light beam 232 that follows the incident light path 212 to the surface 258 of the calibration target 250. The incident light beam 232 illuminates the surface 258 of the calibration target 250, including the first edge 252 and the second edge 254. The frequency of the incident light beam 232 is in the same band of light frequencies that the photodetectors 156 are best able to convert to image data.

The reflection light beam 222 reflects from the surface 258 of the calibration target 250 as a result of the surface 258 being illuminated by the incident light beam 232. The reflection light beam 222 is, thus, an image of the surface 258 of the calibration target 250, including the first edge 252 and the second edge 254. Because the reflection light beam 222 is a section of the image light beam 230, the reflection light beam 222 follows the image light path 214 to the photodetector array 154 in the imaging apparatus 110. The first light beam 234 of the reflection light beam 222 extends from the first edge 252 of the calibration target 250 to the first image photodetector 158. The first light beam 234 is an image of the first edge 252 of the surface 258 and will be imaged by the first image photodetector 158. Likewise, the second light beam 236 extends from the second edge 254 of the calibration target 250 to the last image photodetector 160. The second light beam 236 is an image of the second edge 254 of the surface 258 and will be imaged by the last image photodetector 160. Due to the photodetector array 154 being very narrow, e.g., approximately 11 microns, the imaging apparatus 110 is only able to image a narrow scan line portion 260 of the surface 258 of the calibration target 250. For the purpose of performing calculations to calibrate the imaging apparatus 110, the scan line portion 260 of the surface 258 may be assumed to be an infinitely narrow line.

As previously set forth, the surface 258 of the calibration target 250 is uniformly reflective. Therefore, the section of the image light beam 230 represented by the reflection light beam 222 will have a higher and more uniform intensity of light than other sections of the image light beam 230. As such, the group of image photodetectors 164 will receive light that is uniform and of high intensity relative to the other photodetectors 156. The image photodetectors 164 will, thus, output relatively high and uniform voltages. The voltage values, in the form of image data, of all the individual photodetectors 156 are output from the photosensor 150 to the processor 310 via the image data line 320.

The processor 310 receives the image data from the photosensor 150 and analyzes the image data to calibrate the imaging apparatus 110. Specifically, the processor 310 determines the image distance 218. When the image distance 218 has been determined, the processor may calculate the magnification of the imaging apparatus 110 for objects located at various distances from the imaging apparatus 110. Based on the magnification of the imaging apparatus 110, the processor 310 will be able to measure the lengths of scan line portions of objects imaged by the imaging apparatus 110.

Figure 2:
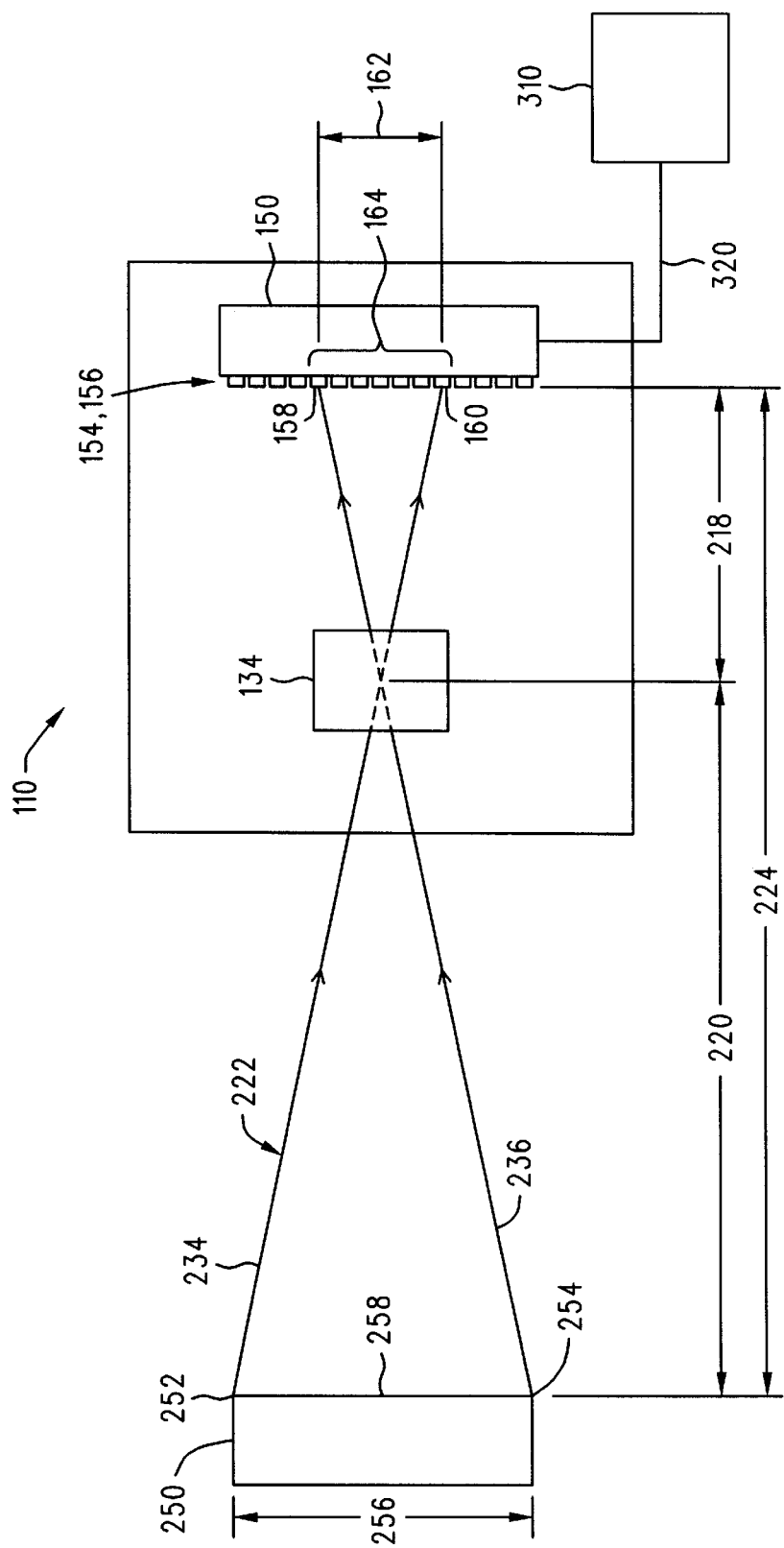
FIG. 2 is a side perspective view of the calibration system of FIG. 1 illustrating the measurements required to calibrate an imaging apparatus.
Figure 3:
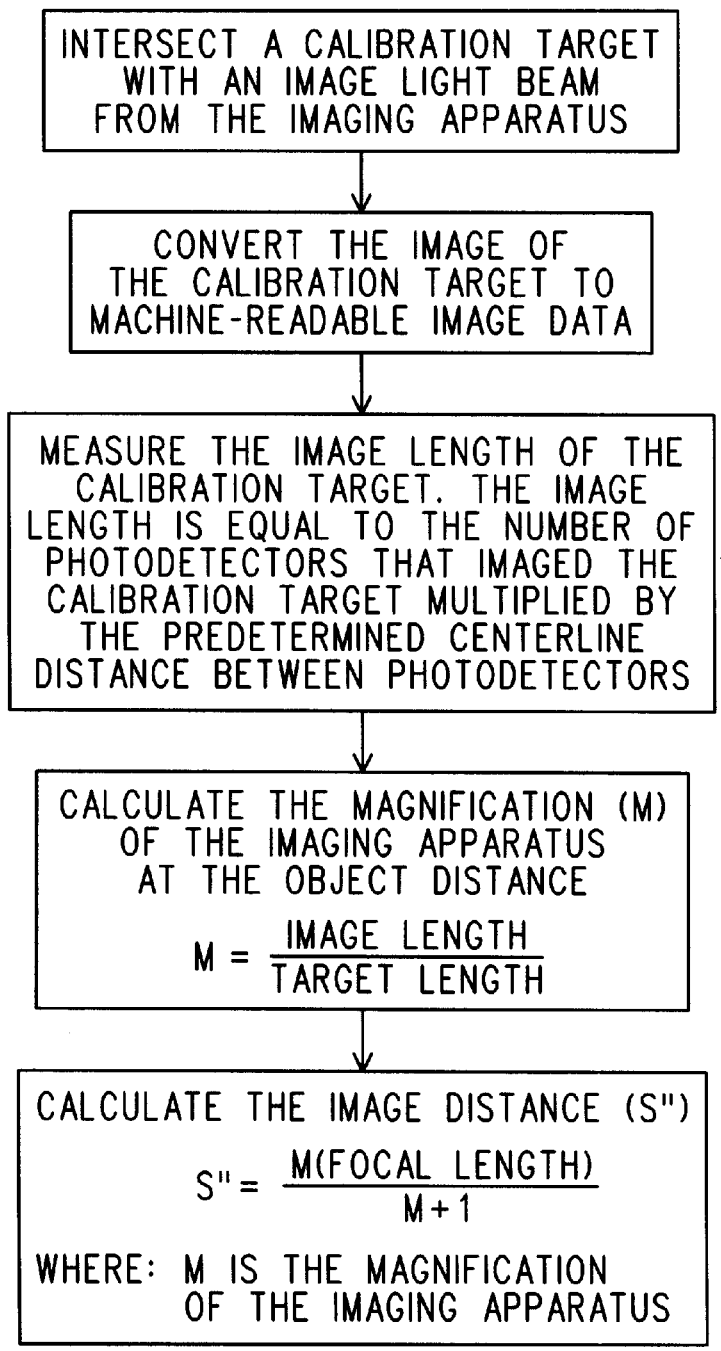
FIG. 3 is a flow chart of a calibration procedure.

FIG. 2 illustrates the distances and measurements that may be used in the calculations to calibrate the imaging apparatus 110. The processor 310 may first measure the image length 162. The image length 162 is the length of the image of the scan line portion 260, FIG. 1, of the surface 258 of the calibration target 250. The image of the scan line portion 260, FIG. 1, is located on the image photodetectors 164 and extends from the first image photodetector 158 to the last image photodetector 160. As previously described, the image photodetectors 164 will output voltages that are relatively high and uniform as compared to the other photodetectors 156. In order to measure the image length 162, the processor 310 may count the number of photodetectors in the group of image photodetectors 164 to arrive at an image number. The processor may then multiply this image number by the predetermined centerline distance between the photodetectors 156. The product is the image length 162. It is noted that the image number may not accurately reflect the number of image photodetectors 164 that image the scan line portion 260, FIG. 1, of the surface 258. This inaccuracy may be due to the first image photodetector 158 and the last image photodetector 160 receiving a partial image of the scan line portion 260, FIG. 1. The inaccuracy may also occur if the image of the scan line portion 260, FIG. 1, extends beyond first image photodetector 158 or the last image photodetector 160, and the extended image is not long enough to be imaged by an adjacent photodetector. These inaccuracies may be minimized by using a photosensor 150 with a high concentration of photodetectors 156 so that the inaccuracy in the image number is negligible. As an example, the photosensor 150 may have approximately 2,700 photodetectors 256 in the photodetector array 254.

Having measured the image length 162, the processor may now calculate the magnification of the imaging apparatus 110 for objects located at the object distance 220 from the lens 134. The magnification, depicted by the letter "M," is calculated by dividing the image length 162 by the known target length 256. When the magnification of the imaging apparatus 110 has been calculated, the image distance 218, depicted by the symbol "S'"", may be calculated by the optical formula:

$$S'' = \frac{M \times (\text{total track length 224})}{M + 1}$$

Where:
M is the magnification of the imaging apparatus 110; and
S" is the image distance 218.

When the image distance 218 (S") has been determined, the magnification of the imaging apparatus 110 may be calculated for any value of the object distance 220, depicted by the symbol, "S," according to the optical formula:

$$M = \frac{S''}{S}$$

Where:
M is the magnification of the imaging apparatus 110;
S is the object distance 220; and
S" is the image distance 218.

The magnification of the imaging apparatus 110 may be calculated for any object distance 220. Therefore, the lengths of scan line portions of objects, i.e., the object length, imaged by the imaging apparatus 110 may be calculated for any object distance 220 by the formula:

$$\text{Object length} = \frac{\text{Image length (164)}}{\text{Magnification } (M)}$$

Likewise, the object distance 220 may be determined when the object length is known by solving the aforementioned optical equations for the object distance 220.

Figure 4:
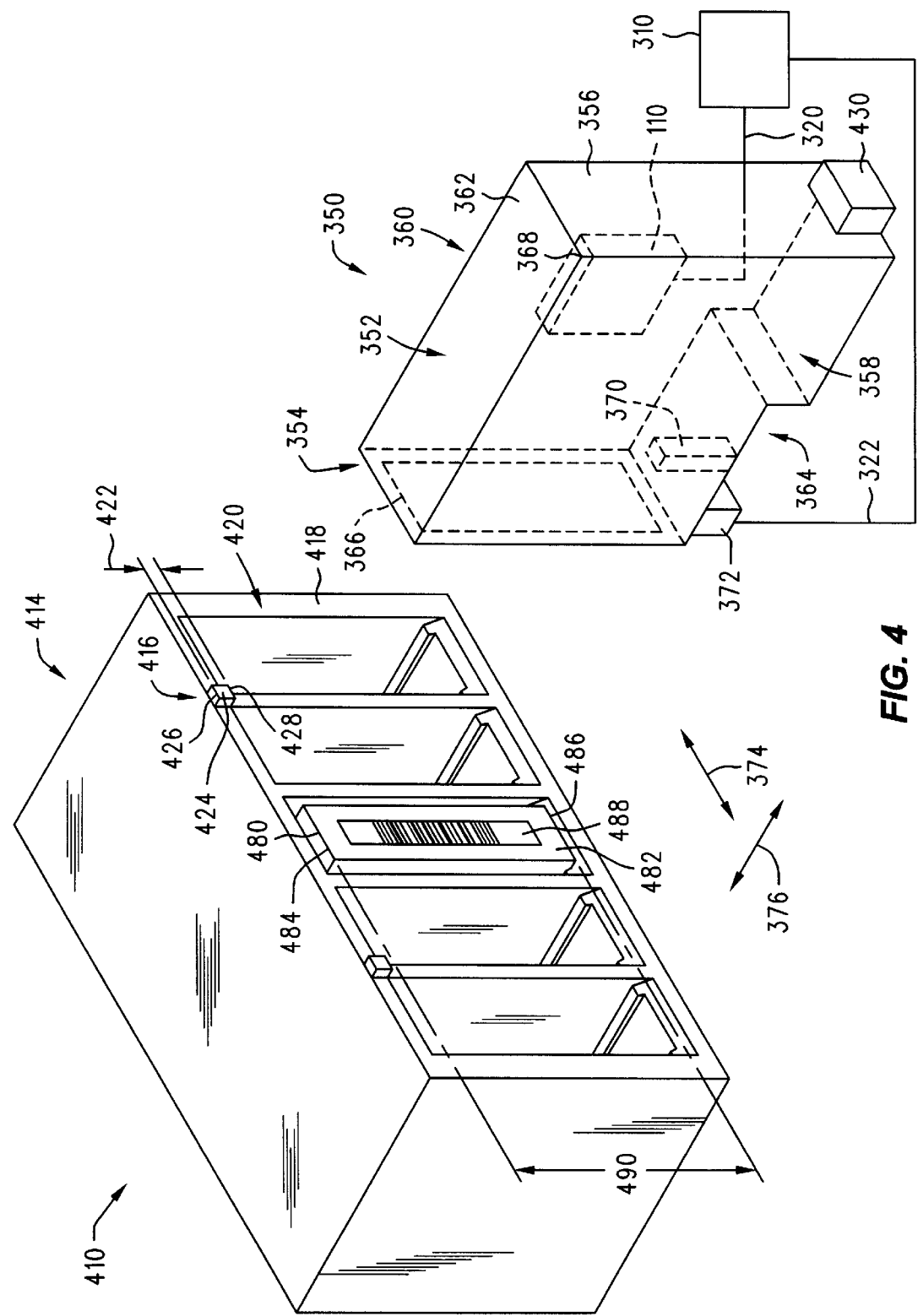
FIG. 4 is a top perspective view of an automated media exchanger incorporating a calibration system.

The calibration system 100 may be integrated into various optical devices to calibrate imaging apparatuses located within the optical devices. FIG. 4, as an example, illustrates a calibration system used in conjunction with an automated media exchanger 410. The automated media exchanger 410 is a device that moves media 480 between a media magazine 410 and a media player, not shown.

Except for the addition of the calibration system 100, as will be described in further detail, the automated media exchanger 410, including the components thereof, may, for example, be of the type commercially available from the Hewlett-Packard Company and sold as Model Number HP 4226w or of the type described in the following U.S. Pat. Nos.: 5,644,559 of Christie, et al., for FLIP LATCH ASSEMBLY FOR MEDIA AUTOCHANGER; and 5,682,096 of Christie, et al., for METHOD AND APPARATUS FOR MONITORING OPERATING POSITIONS OF A MEDIA AUTOCHANGER, which are both hereby incorporated by reference for all that is disclosed therein. The automated media exchanger 410, including the components thereof, are also disclosed, in part, in the following U.S. patent applications: Pat. No. 6,118,598 of Gardner for METHOD AND APPARATUS FOR SETTING FOCUS IN AN IMAGING DEVICE; Ser. No. 09/290,216 of Gardner for ALIGNMENT APPARATUS AND METHOD FOR AN IMAGING SYSTEM, filed on Apr. 13, 1999; and Ser. No. 09/290,428 of Kato et al. for METHOD OF DECIPHERING BAR CODES, filed on Apr. 13, 1999; which are all hereby incorporated by reference for all that is disclosed therein.

The media exchanged by the automated media exchanger 410 may, for example, include compact discs and various forms of magnetic media. The automated media exchanger 410 illustrated in FIG. 4 is depicted as being adapted to move digital linear tape cartridges 480. Specifically, the automated media exchanger 410 may move the digital linear tape cartridges 480 between a magazine 414 and a media player, not shown. The automated media exchanger 410 may comprise a magazine 414, a media handler 350, an imaging apparatus 110, and a calibration target 416. The media handler 350 may also be referred to herein as a "picker." Additionally, a processor 310 may be electrically connected to the imaging apparatus 110 by an image data line 320. The imaging apparatus 110 used in the automated media exchanger 410 may function in the same manner as the imaging apparatus 110 described in FIG. 1.

A digital linear tape cartridge 480 is illustrated as being located in the magazine 414. The digital linear tape cartridge 480 may have a front side 482 that extends from the magazine 414. The front side 482 may be bordered by a top edge 484 and a bottom edge 486. The distance between the top edge 484 and the bottom edge 486 is equal to the height 490 of the digital linear tape cartridge 480. The calibrated imaging apparatus 110 may be capable of measuring the height 490. An indicia 488 may be affixed to the front surface 482. The indicia 488 may, as an example, be a bar code where the bar code conforms to the industry standard "Code 39" specification of bar codes.

The magazine 414 may be a parallelepiped structure. The magazine 414 may comprise at least a front side 418. The magazine front side 418 may comprise a plurality of slots 420. The slots 420 in the front side 418 of the magazine 414 may be openings that may be adapted to hold the digital linear tape cartridges 480. The automated media exchanger 410 may comprise a plurality of magazines 414.

The media handler 350 may have a housing 352 that is a parallelepiped structure. The media handler housing 352 may have a front side 354, a back side 356, a left side 358, a right side 360, a top side 362, and a bottom side 364. The housing 352 may have a corner 368 defined by the intersection of the back side 356, the left side 358, and the top side 362. The front side 354 may have an opening 366 appropriately sized so that a digital linear tape cartridge 480 may pass through the opening 366 and into the housing 352. A servo system 372 may be affixed to the media handler 350 in a conventional manner. The servo system 372 may serve to move the media handler 350 in a transverse direction 374 and a plunge direction 376. The servo system 372 may be electrically connected to the processor 310 by a servo data line 322. The movement of the media handler 350 may be limited in the plunge direction 376 away from the magazine 414 by a physical barrier 430. The media handler 350 illustrated in FIG. 4 is depicted abutting the physical barrier 430.

The imaging apparatus 110 may be affixed to the left side 358 of the interior of the media handler housing 352. Specifically, the imaging apparatus 110 may be located in the vicinity of the corner 368, thereby the imaging apparatus 110 may not interfere with digital linear tape cartridges 480 that may be located within the housing 352. The imaging apparatus 110 may have a depth of field suited to image the indicia 488 that may be affixed to the front surface 482 of the digital linear tape cartridge 480. The indicia 488 may be located on the front surface 482 of the digital linear tape cartridge 480, thus, the depth of field chosen to image the indicia 488 may be applicable to image the top edge 484 and the bottom edge 486 of the digital linear tape cartridge 480. When the imaging apparatus 110 is calibrated, it may be able to measure the height 490 of the digital linear tape cartridge 480.

A light source 370 may also be affixed to the left side 358 of the interior housing 352. As with the imaging apparatus 110, the light source 370 may be located in the housing 352 in such a manner that it does not interfere with a digital linear tape cartridge 480 that may be located in the housing 352. The light source 370 may comprise a plurality of light emitting diodes, not shown. The light source 370 may serve to illuminate objects that are imaged by the imaging apparatus 110, including the calibration target 416. An example of a light source for use in a media handler is disclosed in the U.S. patent applications, Ser. No. 09/290,842 of Gardner for OPTICAL ASSEMBLY HAVING LENS OFFSET FROM OPTICAL AXIS, filed on Apr. 13, 1999; and Ser. No. 09/292,781 of Gardner for LOW POWER ILLUMINATOR, filed on Apr. 13, 1999; which are both hereby incorporated by reference for all that is disclosed therein.

The calibration target 416 may be affixed to any predetermined location in the automated media exchanger 410 that may be imaged by the imaging apparatus 110. Specifically, the calibration target 416 should be located in the automated media exchanger 410 so that the calibration target is in the depth of field of the imaging apparatus 110. The calibration target 416 may, as an example, be affixed to the front side 418 of the magazine 414 as illustrated in FIG. 4. This location for the calibration target 416 may place the calibration target 416 in approximately the same plane as the indicia 488 on the front surface 482 of the digital linear tape cartridge 480. It follows that if the front surface 482 of the digital linear tape cartridge 480 is in the depth of field of the imaging apparatus 110, then the calibration target 416 will also be in the depth of field of the imaging apparatus 110.

The calibration target 416 may have a surface 424 that is uniformly reflective. The surface 424 may, for example, be a flat, light-colored surface. The surface 424 may be bound by a first edge 426 and a second edge 428. The first edge 426 and the second edge 428 may be separated by a predetermined target length 422. The target surface 424 will be imaged by the imaging apparatus 110 and target length 422 will be measured by the processor 310 in order to calibrate the imaging apparatus 110. The target 416 may, for example, be substantially identical to the target 250 previously described.

Figure 5:
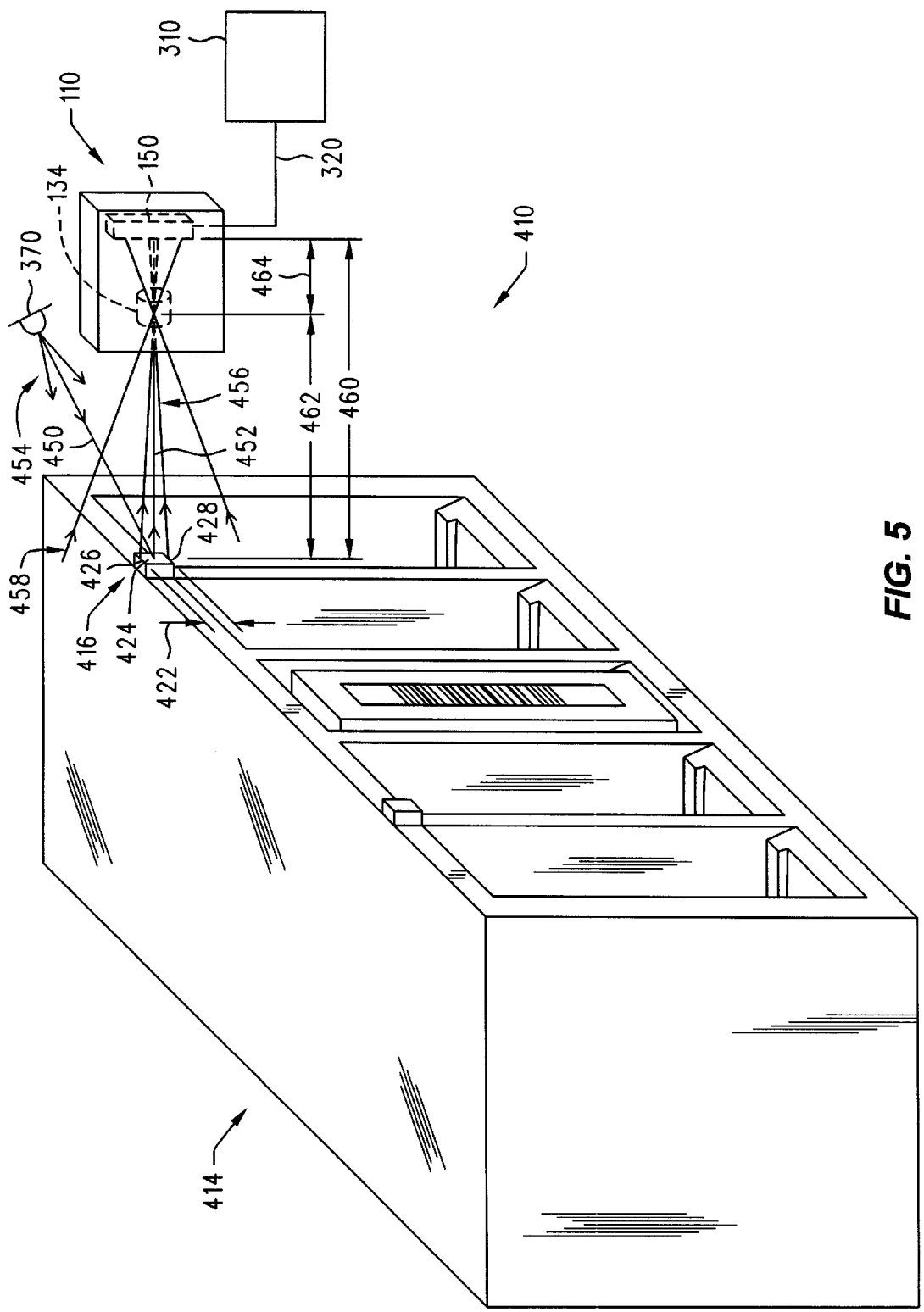
FIG. 5 is side perspective view of a simplified illustration of the automated media exchanger of FIG. 4.

FIG. 5 illustrates a view of the automated media exchanger 410 with the media handler 350 removed from the view to better illustrate the interaction between the imaging apparatus 110 and the calibration target 416. FIG. 5 also illustrates the light beams and light paths that may be present in the automated media exchanger 410. For the purposes of illustration, the light source 370 in FIG. 5 has been moved from the aforementioned location in the media handler 350 illustrated in FIG. 4 to a location above the imaging apparatus 110.

The automated media exchanger 410 may have an incident light path 450 extending between the light source 370 and the calibration target 416. The automated media exchanger 410 may also have an image light path 452 extending between the calibration target 416 and the imaging apparatus 110. As was detailed in FIG. 1, the image light path 452 may terminate at the photosensor 150. An incident light beam 454 may follow the incident light path 450 from the light source 370 to the calibration target 416 and may serve to illuminate the surface 424 of the calibration target 416. An image light beam 458 may follow the image light path 452 from a point external to the imaging apparatus 110 to the photosensor 150. A reflection light beam 456 may reflect from the surface 424 of the calibration target 416. The reflection light beam 456 may be a part of the image light beam 458. The reflection light beam 456 may be an image of the surface 424 of the calibration target 416 including the first edge 426 and the second edge 428.

Referring again to FIG. 4, the imaging apparatus 110 may be located in the vicinity of the corner 368 of the housing 352 of the media handler 350. The image path 452, FIG. 4, may pass through the opening 366 in front side 354 of the media handler 350 and to the imaging apparatus 110. The image light path 452 may be required to be offset in order for the image light path 452 to pass through the opening 366 and enter the imaging apparatus 110. Optical devices, not shown, may be required to be located in the housing 352 to offset the image light path 452. Offsetting an image light beam within a media handler is disclosed in the U.S. patent application, Ser. No. 09/290,842 of Gardner et al., previously referenced.

Referring again to FIG. 5, the surface 424 of the calibration target 416 may be located a known total track length 460 from the photosensor 150 in the imaging apparatus 110. The surface 424 of the calibration target 416 may also be located an approximated object distance 462 from the lens 134. The object distance 462 may, for example, be approximately 133 millimeters. The object distance 462 may be approximated due to the uncertainty in the location of the lens 134 in the imaging apparatus 110. However, the uncertainty in the object distance 462 may have an insignificant effect on the outcome of the calibration because the object distance 462 is generally very large relative to the uncertainty in the location of the lens 134.

The lens 134 may be located an imprecise image distance 464 from the photosensor 150. The image distance 464 may, for example, be 42 millimeters with an imprecision or deviation of approximately one millimeter. The calibration system is able to accurately determine the image distance 464 as previously described. The lens 134 is typically located in close proximity to the photosensor 150. Therefore, a small deviation in the location of the lens 134 will have a significant impact on the image distance 464. Because a small deviation in the location of the lens 134 has a greater impact on the image distance 464 than on the object distance 462, the image distance 464 has the greatest effect on the magnification of the imaging apparatus 110. A slight deviation in the object distance 462 has a negligible effect on the outcome of the magnification of the imaging apparatus 110.

Having described the components in the automated media exchanger 410 associated with calibrating the imaging apparatus 110, the calibration procedure will now be described. The first step in calibrating the imaging apparatus 110 is to move the imaging apparatus 110 to a predetermined location where the imaging apparatus 110 is able to image the calibration target 416. Referring to FIG. 4, the processor 310 may send a data signal to the servo system 372 via the servo data line 322 instructing the servo system 372 to move the media handler 350 to the predetermined location. The servo system 372 will move the media handler 350 in the plunge direction 376 until the media handler 350 contacts the physical barrier 430. The servo system 372 will also move the media handler 350 in the transverse direction 374 to a point where the opening 366 in the front side 354 of the media handler 350 is opposite the calibration target 416. Referring again to FIG. 5, the location of the media handler, not shown in FIG. 5, in the transverse direction 374 is so that the image light beam 458 intersects the calibration target 416.

When the media handler 350 is in the aforementioned predetermined location, the light source 370 will emit an incident light beam 454. The incident light beam 454 follows the incident light path 450 from the light source 370 to the calibration target 416 so as to illuminate the surface 424 of the calibration target 416. The reflection light beam 456 reflects from the illuminated surface 424 of the calibration target 416 along the image light path 452 and to the photosensor 150 in the imaging apparatus 110. The reflection light beam 456 is an image of the surface 424 of the calibration target 416, including the first edge 426 and the second edge 428.

The imaging apparatus 110 receives light from the image light beam 458, which is partially comprised of the reflection light beam 456. The image light beam 458, thus, includes an image of the surface 424 of the calibration target 416 as well as images of other objects that intersect the image light beam 458. The image light beam 458 is focused onto the photosensor 150 by the lens 134.

The photosensor 150 converts the intensities of light in the image light beam 458 to image data. The imaging apparatus 110 then outputs the image data from the photosensor 150 to the processor 310 via the image data line 320. The image data will have a section in the data indicating that the photosensor 150 received a relatively intense and uniform light beam, which, as previously stated, is indicative of the image of the calibration target 416. The processor 310 will analyze the image data from the photosensor 150 that corresponds to the image of the calibration target 416 to calibrate the imaging apparatus 110.

The processor 310 may first measure the length of the image of the calibration target 416 on the photosensor 150. As previously detailed, the length of the image of the calibration target 416 may be measured by multiplying the number of photodetectors, not shown in FIG. 5, that receive an image of the calibration target 416 by the predetermined centerline distance between the photodetectors. When the processor has measured the length of the image of the calibration target 416, the processor may then calculate the magnification of the imaging apparatus 110 at the object distance 462. The magnification may be calculated by dividing the length of the image of the calibration target 416 on the photosensor 150 by the target length 422. When that the magnification of the imaging apparatus 110 is known, the processor may calculate the image distance 464 (S") by the use of the optical formula:

$$S'' = \frac{M \times (\text{total track length } 460)}{M + 1}$$

Where:

M is the magnification of the imaging apparatus 110; and
S" is the image distance 218.

When the image distance 464 (S") has been determined, the magnification (M) of the imaging apparatus 110 may be determined for any value of the object distance 462 (S) by the optical formula:

$$M = \frac{S''}{S}$$

Where:

M is the magnification of the imaging apparatus 110;
S is the object distance 220; and
S" is the image distance 218.

The magnification of the imaging apparatus 110 may be calculated for any object distance 462. Therefore, the lengths of scan line portions of objects, noted as the object length, imaged by the imaging apparatus 110 may be calculated for any object distance 462 by the formula:

$$\text{Object length} = \frac{\text{Image length}}{\text{Magnification}(M)}$$

When the magnification (M) of the imaging apparatus 110 is know, the imaging apparatus 110 may provide information to the automated media exchanger 410 about objects being imaged. For example, the height 490 of the digital linear tape cartridge 480 may be measured by imaging the first edge 484 and the second edge 486 of the front surface 482. As with the calibration target 416, the processor 310 may measure the length of the image of the front surface 486 on the photosensor 150 to arrive at an image length. The processor 310 may then divide this image length by the magnification of the imaging apparatus 110. The dividend will be the height 490 of the digital linear tape cartridge 480. In the alternative, if the height 490 of the digital linear tape cartridge 480 is known, processor 310 may reverse the aforementioned equations to solve for the object distance 462 between the digital linear tape cartridge 480 and the lens 134.

The ability of the processor 310 to measure the size of objects located in the image beam 458 has many uses in an automated media exchanger. As an example, the imaging apparatus 110 may image objects to determine the size of the objects. The following United States patent application describes using an imaging apparatus to measure the size of objects located in an automated media exchanger, Ser. No. 09/290,926 of Gardner et al. for AUTOMATED OPTICAL DETECTION SYSTEM AND METHOD, filed on Apr. 13, 1999 and is hereby incorporated by reference for all that is disclosed therein.

Knowing the size of objects located in an automated media exchanger may assist the automated media exchanger in guiding the media handler. The following U.S. patent applications describe guidance systems used in automated media exchangers and are both hereby incorporated by reference for all that is disclosed therein: Ser. No. 09/290,429 of Gardner et al. for IMAGING APPARATUS ALIGNMENT SYSTEM AND METHOD filed on Apr. 13, 1999; and Ser. No. 09/291,242 of Gardner et al. for GUIDANCE SYSTEM AND METHOD FOR AN AUTOMATED MEDIA EXCHANGER, filed on Apr. 13, 1999.

Other embodiments of the calibration target may be used with the calibration system. For example, the calibration target may have a surface that is reflective relative to the surroundings of the calibration target. In the alternative, the calibration target may have a surface that is nonreflective relative to the surroundings of the calibration target. Whether the calibration target is relatively reflective or nonreflective, the processor must be able to distinguish the calibration target from objects surrounding the calibration target. The calibration target may also be in the form of different shapes as detailed below.

Figure 6:
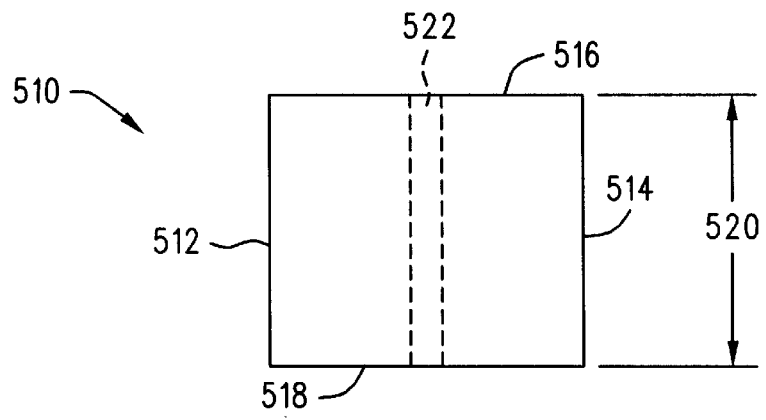
FIG. 6 is a schematic illustration of a calibration target in the shape of a square.

FIG. 6 depicts a calibration target 510 in the shape of a square. The following description of the square also applies to a calibration target in the shape of a rectangle. The calibration target 510 may have a left edge 512, a right edge 514, a top edge 516, and a bottom edge 518. The top edge 516 may be parallel to the bottom edge 518 and the top edge 516 and the bottom edge 518 may be separated by a predetermined target length 520. The calibration target 510 may be used for calibrating an imaging apparatus by imaging a scan line portion 522 of the calibration target 510. The scan line portion 522 may extend between the top edge 516 and the bottom edge 518. The scan line portion 522 may be approximately perpendicular to the bottom edge 518. Calibration may then be based on the target length 520.

The calibration target 500 has an advantage over calibration targets formed in other shapes because the scan line portion 522 of the calibration target 500 is parallel to the left edge 512 and the right edge 514. Thus, the length 520 of the scan line 522 will be a constant value irrespective of the location where the image beam intersects the calibration target 500.

Figure 7:
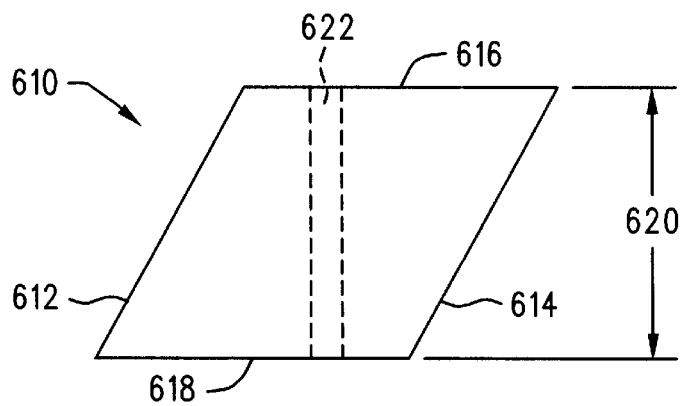
FIG. 7 is a schematic illustration of a calibration target in the shape of a parallelogram.

FIG. 7 depicts an embodiment of a calibration target 610 in the shape of a parallelogram. The following description of the calibration target 610 may also be applicable for a calibration target in the shape of a trapezoid. The calibration target 610 may have a left edge 612, a right edge 614, a top edge 616 and a bottom edge 618. The top edge 616 may be parallel to the bottom edge 618. The top edge 616 and the bottom edge 618 may be separated by a predetermined target length 620 where the target length 620 is based on a line extending perpendicular to the top edge 616 and the bottom edge 618. The imaging apparatus may image a scan line portion 622 of the calibration target 610. The scan line portion 622 may extend between the top edge 616 and the bottom edge 618 and may be perpendicular to the top edge 616 and the bottom edge 618. Calibration may be based on the target length 620.

Figure 8:
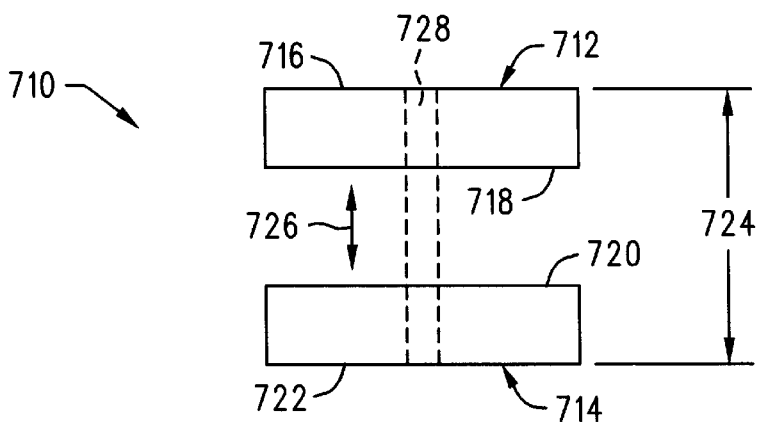
FIG. 8 is a schematic illustration of a calibration target in the form of two parallel lines.

FIG. 8 depicts a calibration target 710 that comprises two parallel lines. The calibration target 710 may have a first line 712 and a second line 714. The first line 712 may have an upper edge 716 and a lower edge 718. Likewise, the second line 714 may have an upper edge 720 and a lower edge 722. The edges 716, 718, 720, and 722 may be parallel to each other. The upper edge 716 of the first line 712 and the lower edge 722 of the second line 714 may be separated by a predetermined outer distance 724. The lower edge 718 of first line 712 and the upper edge 720 of the second line 714 may be separated by a predetermined inner distance 726. The imaging apparatus may image a scan line portion 728 of the target 710. The scan line portion 728 may be perpendicular to the edges 716, 718, 720, and 722. The scan line portion 728 may extend between the upper edge 716 of the first line 712 and the lower edge 722 of the second line 714. Calibration may be established using either the predetermined outer distance 724 or the predetermined inner distance 726.

The two lines 712 and 714 may serve to distinguish the calibration target 710 from other objects imaged by an imaging apparatus. For example, the image data representing the scan line portion 728 will have two areas of high light intensity separated by an area of low light intensity. The areas of high light intensity correspond to the first line 712 and the second line 714. The area of low light intensity corresponds to the distance 726 between the first line 712 and the second line 714. The processor may be able to assure that the image data represents the calibration target 710 based on the aforementioned light intensity pattern generated by the calibration target 710. The calibration target 710 may be used in situations where the processor may otherwise have difficulty distinguishing image data representing a calibration target from image data representing other imaged objects.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A method of calibrating an imaging apparatus, wherein said imaging apparatus is of the type comprising a lens and a photosensor, said lens and said photosensor being separated by an image distance, said method comprising:

providing a target, said target having a predetermined target length and being located a predetermined object distance from said lens;

generating an image of said target with said imaging apparatus;

determining the image length of said image of said target;

determining said image distance based upon said image length, said target length, and said object distance.

2. The method of claim 1 further comprising calculating the magnification of said imaging apparatus.

3. The method of claim 1 wherein said photosensor comprises a linear array of adjacent photodetectors, each of said photodetectors having a centerline, and the distance from a centerline of one photodetector to a centerline of an adjacent photodetector being a predetermined distance; said determining said image length comprising multiplying the number of said photodetectors that receive an image of said target by said predetermined distance between centerlines of said adjacent photodetectors.

4. The method of claim 1 wherein said target has a surface.

5. The method of claim 4 wherein said surface has substantial uniform reflectivity.

6. The method of claim 1 wherein said target is the shape of a parallelogram, said parallelogram having a first edge and a second edge separated by said predetermined target length.

7. The method of claim 1 wherein said target is the shape of a trapezoid, said trapezoid having a first edge and a second edge, said first edge being approximately parallel to said second edge, and said first edge and said second edge being separated by said predetermined target length.

8. The method of claim 1 wherein said target comprises two parallel lines, wherein said lines are separated by said predetermined target length.

9. The method of claim 1 further comprising illuminating said target.

10. A method of calibrating an imaging apparatus within an automated media exchanger, wherein said imaging apparatus is of the type comprising a lens and a photosensor, said lens and said photosensor being separated by an image distance; said method comprising:

providing a target, said target having a predetermined target length and being located a predetermined object distance from said lens;

generating an image of said target with said imaging apparatus;

determining the image length of said image of said target;

determining said image distance based upon said image length, said target length, and said object distance.

11. The method of claim 10 further comprising illuminating said target.

12. The method of claim 10 wherein said automated media exchanger is of the type comprising a picker mechanism and wherein said imaging apparatus is operatively connected to said picker mechanism; said method of positioning comprising, positioning said picker mechanism adjacent said calibration target.

13. The method of claim 10 wherein said automated media exchanger is of the type comprising a media holding device wherein said media holding device comprises a first side, said first side having a plurality of openings adapted to hold media, and wherein said calibration target is located on a plane that is approximately parallel to said holding device first side.

14. A calibration system for an imaging apparatus, said imaging apparatus being of the type comprising a lens and a photosensor, said lens and said photosensor being separated by an image distance; said calibration system comprising:

a target associated with said imaging apparatus;

a light source associated with said target;

wherein said target has a predetermined target length and is located a predetermined object distance from said lens; and wherein said target is imageable by said imaging apparatus.

15. The system of claim 14 wherein said target is shaped as a parallelogram, said parallelogram having a first edge and a second edge separated by said predetermined target length.

16. The system of claim 14 wherein said target is shaped as a trapezoid, said trapezoid having a first edge and a second edge, wherein said first edge is approximately parallel to said second edge, and wherein said first edge and said second edge are separated by said predetermined target length.

17. The system of claim 14 wherein said target comprises two parallel lines, wherein said lines are separated by said predetermined target length.

18. The system of claim 14 wherein said target has a surface.

19. The system of claim 18 wherein said surface has substantially uniform reflectivity.

20. The system of claim 14 wherein said photosensor comprises a linear array of adjacent photodetectors, each of said photodetectors having a centerline, and the distance from a centerline of one photodetector to a centerline of an adjacent photodetector being a predetermined distance.

21. The system of claim 14 further comprising a processor operatively connected to said photosensor, said processor being programmed to determine said image distance.

22. An automated media exchanger incorporating a calibration system for an imaging apparatus, said imaging apparatus being of the type comprising a lens and a photosensor separated by an image distance, said automated media exchanger comprising:

a target associated with said automated media exchanger;

a light source associated with said target;

wherein said target has a predetermined target length and is located a predetermined object distance from said lens; and wherein said target is imageable by said imaging apparatus.

23. The automated media exchanger of claim 22 wherein said target is shaped as a parallelogram, said parallelogram having a first edge and a second edge separated by said predetermined target length.

24. The automated media exchanger of claim 22 wherein said target is shaped as a trapezoid, said trapezoid having a first edge and a second edge, wherein said first edge is approximately parallel to said second edge, and wherein said first edge and said second edge are separated by said predetermined target length.

25. The automated media exchanger of claim 22 wherein said target comprises two parallel lines, wherein said lines are separated by said predetermined target length.

26. The automated media exchanger of claim 22 further comprising a picker device, wherein said imaging apparatus is operatively connected to said picker device.

27. The automated media exchanger of claim 22 further comprising a media holding device, said media holding device comprising a first side wherein said first side has a plurality of openings adapted to hold media; and wherein said target is located on a plane that is approximately parallel to said media holding device first side.

28. The automated media exchanger of claim 22 wherein the reflectivity of said target is approximately uniform.

29. The automated media exchanger of claim 22 wherein said photosensor comprises a linear array of photodetectors, each of said photodetectors having a centerline, wherein said photodetectors are spaced a predetermined distance from a said centerline of a said photodetector to a centerline of another of said photodetectors.

30. The automated media exchanger of claim 22 further comprising a processor operatively connected to said photosensor, said processor being programmed to determine said image distance.

* * * * *